US006189107B1

(12) United States Patent
Kim et al.

(10) Patent No.: US 6,189,107 B1
(45) Date of Patent: Feb. 13, 2001

(54) FAULT TOLERANT VOLTAGE REGULATOR MODULE CIRCUIT FOR SUPPLYING CORE VOLTAGE AND CACHE VOLTAGE TO A PROCESSOR

(75) Inventors: Hyung-sun Kim; In-ho Lee, both of Seoul; Ho-kyu Son, Suwon; Myung-woo Lee, Seoul; Jong-chel Weon, Seoul; Seung-wha Yoo, Seoul, all of (KR)

(73) Assignee: SamSung Electronics Co., Ltd., Suwon (KR)

( * ) Notice: Under 35 U.S.C. 154(b), the term of this patent shall be extended for 0 days.

(21) Appl. No.: 09/219,877

(22) Filed: Dec. 24, 1998

(30) Foreign Application Priority Data

Dec. 29, 1997 (KR) .................................................. 97-76539

(51) Int. Cl.[7] .............................. G06F 1/26; G06F 11/16; H02J 9/00
(52) U.S. Cl. ........................... 713/300; 713/340; 714/14; 307/86
(58) Field of Search .................................... 713/300, 340; 327/404, 408; 307/44, 65, 43, 80, 86; 714/22, 14, 6, 25; 323/271, 281; 320/152; 711/118

(56) References Cited

U.S. PATENT DOCUMENTS

| | | |
|---|---|---|
| 4,292,581 | * 9/1981 | Tan . |
| 4,791,443 | 12/1988 | Foley et al. . |
| 4,812,672 | 3/1989 | Cowan et al. . |
| 4,954,993 | 9/1990 | Yamaguchi et al. . |
| 5,103,157 | 4/1992 | Wright . |
| 5,138,184 | 8/1992 | Keefe . |
| 5,187,382 | 2/1993 | Kondo . |
| 5,493,155 | 2/1996 | Okamoto et al. . |
| 5,498,913 | 3/1996 | Moritani . |
| 5,598,041 | 1/1997 | Willis . |
| 5,708,771 | 1/1998 | Brant et al. . |
| 5,745,670 | 4/1998 | Linde . |
| 5,796,274 | 8/1998 | Willis et al. . |
| 5,811,895 | 9/1998 | Suzuki et al. . |

* cited by examiner

Primary Examiner—Gopal C. Ray
(74) Attorney, Agent, or Firm—Robert E. Bushnell, Esq.

(57) ABSTRACT

A fault tolerant voltage regulator module (VRM) circuit for a processor simultaneously supplies a core voltage to a plurality of processors, has a plurality of main VRMs (VRM) for supplying the same core voltage to the plurality of processors, a stand-by VRM for use upon a fault occurring in the plurality of main VRMs, a plurality of diodes connected in parallel between each of the main VRMs and the stand-by VRM for automatically supplying power to the stand-by VRM, a plurality of first power islands for connecting each of the plurality of main VRMs to the processor and each of output port of the plurality of diodes, a control signal set switch for setting output voltage level of the stand-by VRM and a second power island for connecting the stand-by VRM to input ports of the plurality of diodes and the control signal set switch. When a processor core voltage level and L2 cache voltage level are different, a fault tolerant VRM circuit further has a plurality of schottky diodes and a plurality of power MOSFETs for by-passing the schottky diodes so that the stand-by VRM can support two different voltage levels. The circuit improves stability of supplying board power owing to a fault tolerant VRM in processors and enables just one stand-by VRM to effect simultaneous support of a plurality of main VRMs and even different voltage level main VRMs using schottky diodes.

21 Claims, 2 Drawing Sheets

FAULT TOLERANT VOLTAGE REGULATOR MODULE CIRCUIT FOR SUPPLYING CORE VOLTAGE AND CACHE VOLTAGE TO A PROCESSOR

CLAIM OF PRIORITY

This application makes reference to, incorporates the same herein, and claims all benefits accruing under 35 U.S.C. §119 from an application for A FAULT TOLERANT VOLTAGE REGULATOR MODULE CIRCUIT FOR SUPPLYING CORE VOLTAGE AND CACHE VOLTAGE TO INTEL PROCESSOR earlier filed in the Korean Industr Property Office on Dec. 29, 1997 and there duly assigned Ser. No. 76539/1997.

BACKGROUND OF THE INVENTION

1. Filed of the Invention

This invention relates to a voltage regulator module (VRM) circuit for a processor and in particular to a VRM circuit having a fault tolerant stand-by voltage regulator module for supplying power to a processor in the event that main VRMs fail. The stand-by VRM is coupled through diodes to the main VRMs.

2. Description of the Related Art

An earlier voltage regulator module for a processor will be explained as follows. The earlier processor converts +12 volts or +5 volts to comply with the processor using a VRM and provides a CPU core voltage and L2 cache voltage.

Processors more advanced than INTEL Pentium II microprocessors need two VR because the processor core voltage level and L2 cache voltage level are different. When the voltage regulator modules supplying voltages supply a low voltage or become inoperative because of the high consumption power of the microprocessor, the processor also fails or becomes inoperative.

Afterward, because the processor has no back-up devices, the system is down if the processor is a single microprocessor and the system performance is reduced, if a multiprocessor system.

Also, a microprocessor more advanced than INTEL Pentium II microprocessors need two voltage regulator modules per processor, so that the multi-processor system depends on many voltage regulator modules and is increased in a dependence of voltage regulator module.

The following patents each discloses features in common with the present invention but dot not teach or suggest the specifically recited fault tolerant voltage regulator module circuit of the present invention: U.S. Pat. No. 5,745,670 to Linde, entitled Fault Tolerant Power Supply System, U.S. Pat. No. 5,598,041 to Willis, entitled Efficient Fault Tolerant Switching Circuit For Redundant D.C. Power Supplies, U.S. Pat. No. 5,811,895 to Suzuki et al., entitled Power Supply Circuit For Use With A Battery And An AC Power Adaptor, U.S. Pat. No. 5,493,155 to Okamoto et al., entitled Electric Power Supply System, U.S. Pat. No. 5,498,913 to Moritani, entitled Power Supply Control Apparatus With A Manually Operable Control Switch, U.S. Pat. No. 4,954,993 to Yamaguchi et al., entitled Semiconductor Integrated Circuit Having A Plurality Of Circuit Blocks Respectively Supplied With Power From Different Power Sources, U.S. Pat. No. 5,103,157 to Wright, entitled Common Emitter Amplifiers Operating From A Multiplicity Of Power Supplies, U.S. Pat. No. 5,138,184 to Keefe, entitled Solid State Static Power Transfer Mechanism, U.S. Pat. No. 5,187,382 to Kondo, entitled Apparatus For Detecting The Existence Of An Abnormality In A Vehicle Operator Protection System, U.S. Pat. No. 4,791,443 to Foley et al., entitled Photographic Processor With Auxiliary Power Supply, U.S. Pat. No. 4,812,672 to Cowan et al, entitled Selective Connection OfPower Supplies, U.S. Pat. No. 5,708,771 to Brant et al., entitled Fault Tolerant Controller System And Method, and U.S. Pat. No. 5,796,274 to Willis et al., entitled Fault Tolerant Most Driver.

SUMMARY OF THE INVENTION

It is an object of the present invention to provide a fault tolerant voltage regulator module circuit for supplying core voltage to processors, which has a stand-by voltage regulator module preventing the system from being down and for supplying power to processors in the event that main voltage regulator modules supply a low voltage or are down. The stand-by voltage regulator module is coupled through diodes to the main voltage regulator modules.

It is another object of the present invention to provide a fault tolerant voltage regulator module circuit for supporting even different voltage level main VRMs at the same time by using schottky diodes.

It is still another object of the present invention to provide a fault tolerant voltage regulator module circuit having the stand-by VRM make support a plurality of main VRMs at the same time.

According to one preferred embodiment, when a processor core voltage and cache voltage are different, a fault tolerant voltage regulator module circuit for supplying core voltage and cache voltage to a processor has a plurality of main voltage regulator modules for supplying core voltage and L2 cache voltage to the processor, a stand-by voltage regulator module for when a fault occurs in the plurality of main voltage regulator modules, a plurality of diodes coupled in parallel between each of the plurality of main voltage regulator modules and the stand-by voltage regulator module for automatically supplying power of the stand-by voltage regulator module, a plurality of first power islands connecting each of the plurality of main VRMs with the processor and each of output port of the plurality of diodes, a control signal set switch for setting output voltage level of the stand-by voltage regulator module, and a second power island connecting the stand-by VRM with input port of the plurality of diodes and the control signal set switch.

According to the present invention, to allow the stand-by VRM to support both core voltage and L2 cache voltage, a power MOSFET is coupled in series with a plurality of schottky diodes and in parallel with one of the plurality of diodes, which is connected to a L2 cache VRM of the plurality of main VRMs and a plurality of power MOSFETs by-pass predetermined ones of the plurality of schottky diodes by control of the control signal set switch. According to another preferred embodiment, a fault tolerant VRM circuit for simultaneously supplying core voltage to a plurality of processors has a plurality of main VRMs for supplying the same output voltage level to the plurality of processors, a stand-by VRM for when a fault occurs in the plurality of main VRMs, a plurality of diodes coupled in parallel between each of the plurality of main VRMs and the stand-by VRM for automatically supplying power of the stand-by VRM, a plurality of first power islands for connecting each of the plurality of main VRMs with the processor and each of output port of the plurality of diodes, a control signal set switch for setting output voltage level of the stand-by VRM, and a second power island for connecting the stand-by VRM with input port of the plurality of diodes and the control signal set switch.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PRESENT INVENTION

One preferred embodiment will be explained in detail referring to FIGS. 1 and 2.

In an INTEL processor, for example, embodying the present invention, a stand-by VRM voltage is set to be as low as diode voltage drop value rather than the main VRM voltage and the stand-by VRM output voltage is programmed by a pull-up resistor or dip switch. When the main VRMs (10) (40) supply a relatively low voltage or are down, a forward bias turn-on occurs in a diode and the high programmed stand-by VRM (20) supplies power to the processor.

Additionally, one stand-by VRM (20) is coupled through a plurality of diodes (D1 and D2) to a plurality of main voltage regulator modules (10) (40), so that the stand-by VRM can back up it in the event that just one of a plurality of main VRMs fails or is down.

Figure 1:
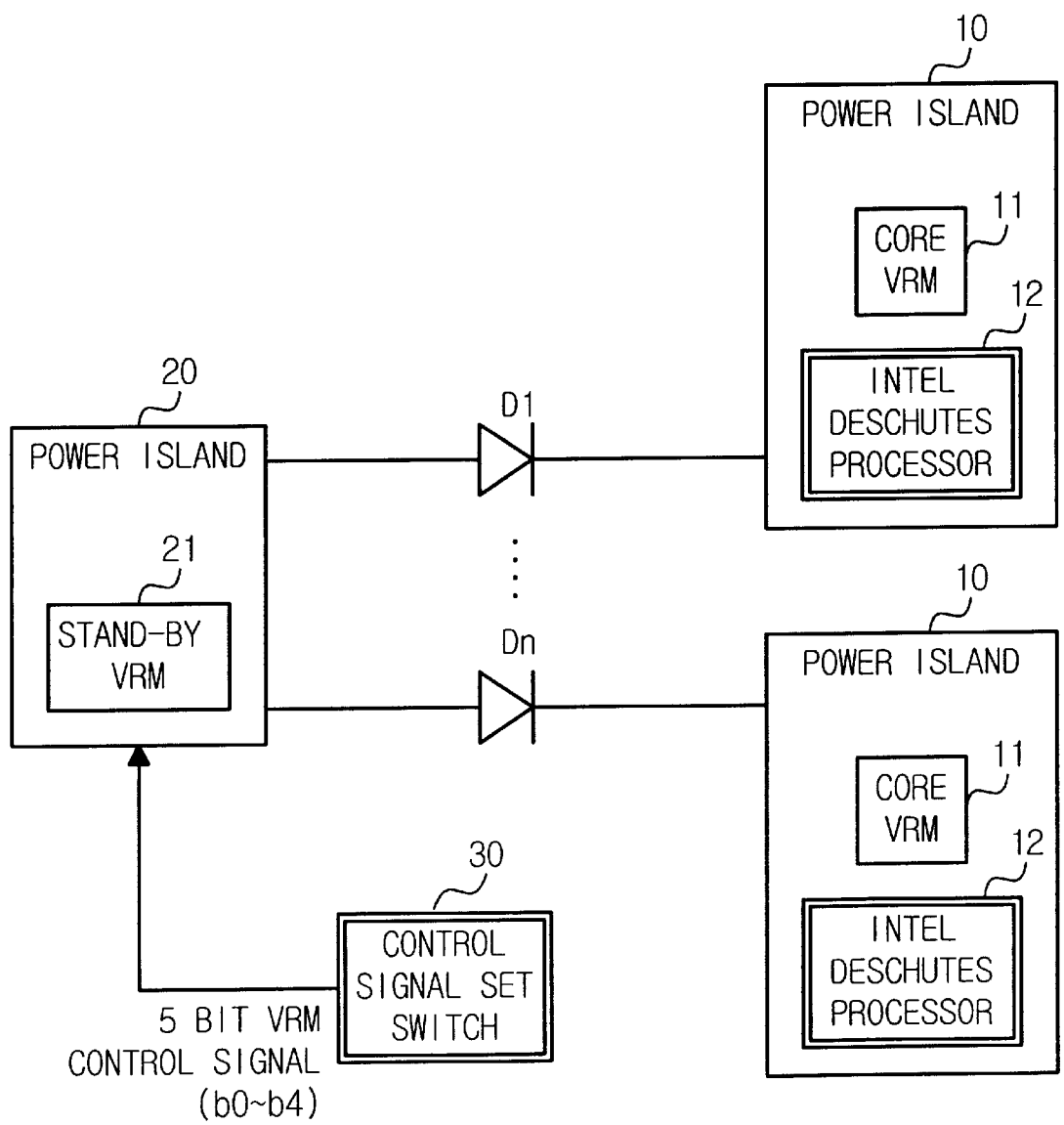
FIG. 1 illustrates a fault tolerant circuit diagram for simultaneously providing core power to two INTEL Deschutes processors, for example, according to the present invention.

FIG. 1 illustrates a fault tolerant VRM circuit diagram for providing core power for two INTEL Deschutes processors, for example, at the same time. A stand-by VRM (12) programs output voltage by using a 5 bit control signal (b0~b4) and sets output voltage as high as voltage drop value of the diodes (D1 and D2) by using a control signal set switch (30). The fault tolerant VRM circuit implemented using INTEL processors (12) in the FIG. 1 simultaneously provides core voltage to a plurality of processors. As illustrated in FIG. 1, a power island (10) connects the processor (12) and the core VRM (11) with the diodes (D1) (D2). A power island (20) connects the stand-by VRM (21) to input ports of the diodes (D1) (D2).

Figure 2:
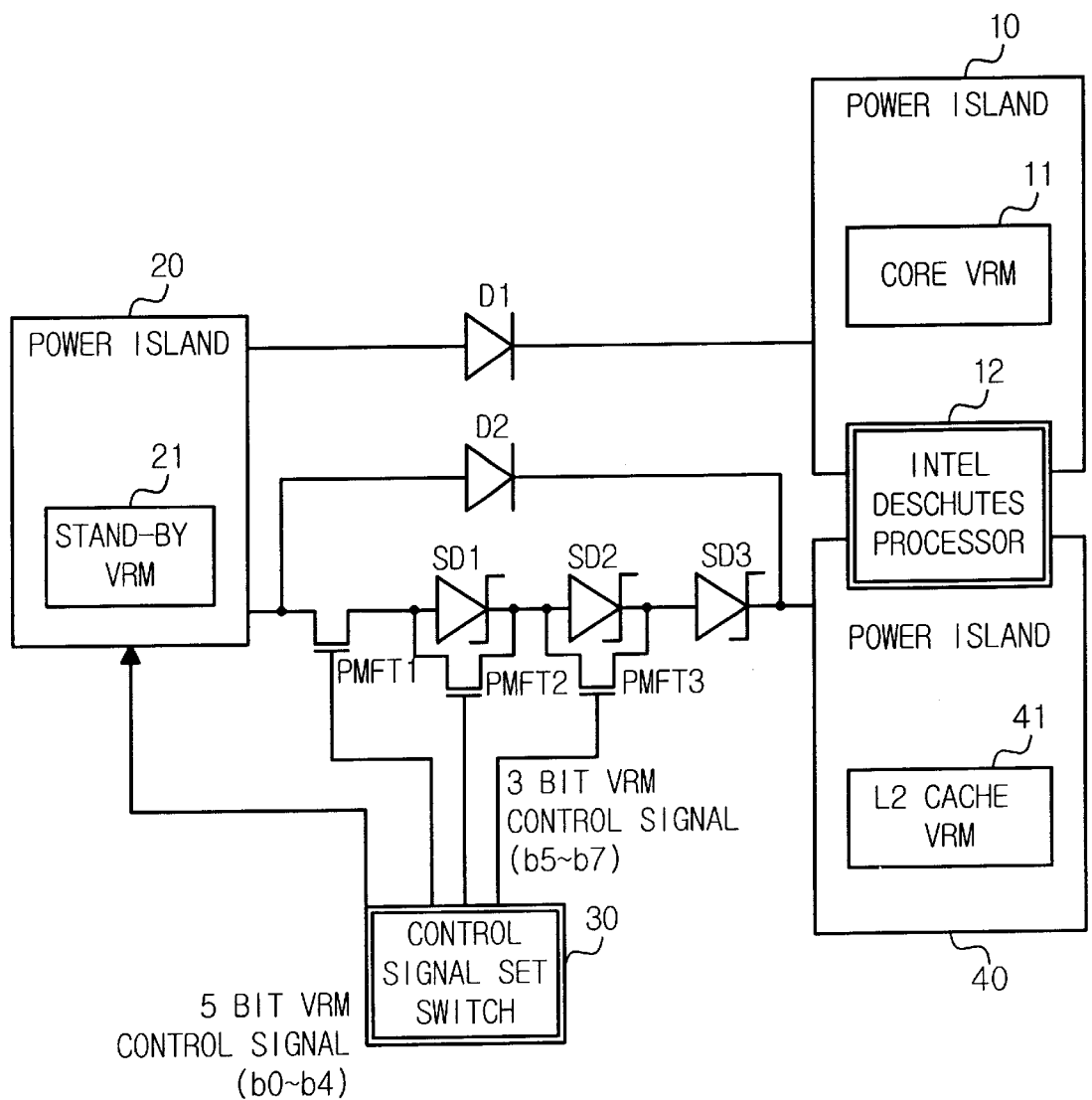
FIG. 2 illustrates a fault tolerant circuit diagram allowing one stand-by voltage regulator module to simultaneously provide two different output voltage levels, one of which is an INTEL Deschutes processor, for example, core voltage and the other is a L2 cache voltage.

FIG. 2 illustrates a fault tolerant VRM circuit diagram having one stand-by VRM for providing core voltage and L2 cache voltage that are respectively different. Voltage drop value of schottky diodes (SD1) (SD2) (SD3) is less than that of the diodes (D1) (D2), so that output voltage is produced as requested by serial arrangement of the schottky diodes.

A stand-by VRM is able to control output voltage level with 5 bit control signals (b0~b4), so that the VRM sets output level as high as voltage drop value of diodes (D1~Dn) by using a control signal set switch (30). The control signal set switch (30) is set to connect schottky diodes at a range of a to 3 so as to generate desired output voltage by combination of 3 bit control signals.

A power island (10) (40) connects the processor (12), core VRM(11) and cache VRM (41) to the diodes (D1) (D2) respectively. A power VRM (20) connects the stand-by VRM to input ports of the diodes (D1) (D2).

The INTEL DESCHUTES processor (12), for example, is designed to operate at a core voltage in a range of 1.8 V to 2.1V and at a cache voltage in the range of 1.8V to 2.8V and a difference value between two voltages is compensated for by the combination of the schottky diodes (SD1) (SD2) (SD3) as illustrated in FIG. 2.

The schottky diodes (SD1)(SD2) are connected in parallel with power MOSFETs (PMFT2)(PMFT3) respectively, but the schottky diode (SD1) is connected in series with power MOSFET (PMFT1) and the stand-by VRM(21).

The core VRM (11) supplies processor core voltage, the cache VRM (41) supplies L2 cache voltage and the stand-by VRM (21) supplies back-up power when the two main VRMs (11)(41) fail.

Upon detecting sudden voltage drop caused by fault in any main VRM between each of the main (11)(41) and the stand-by VRM (21), power of the stand-by VRM (21) is automatically supplied.

In consideration with forward voltage drop of diodes (D1) (D2), a control signal set switch (30) sets output voltage level of the stand-by VRM (21), which is as high as the voltage drop value rather than the main VRMs voltage level.

The stand-by VRM output voltage level is controlled by outside pull-up resistor or a dip switch.

The processor (12) operates normally at a core voltage in a range of 1.8 V to 2.1 V and at a cache voltage in the range of 1.8 V to 2.8 V. The difference value of the two voltages is compensated by combination of the schottky diodes (SD1) (SD2) (SD3). The control signal set switch (30) is set to connect schottky diode from 0 up to 3 as needed so as to generate desired output voltage by combination of 3 bit control signal (b5~b7).

Another preferred embodiment in FIG. 1 is explained similar to that in FIG. 2 on the basic ground.

The present invention improves stability of supplying board power owing to a fault tolerant VRM in processors and enables just one stand-by VRM to make simultaneous support of a plurality of main VRMs and even different voltage level VRMs using schottky diodes.

While the invention is susceptible to various modification and alternative forms, specific embodiments thereof have been shown by way of example in the drawings and detected description. It should be understood, however, that the present invention is not limited to the particular forms disclosed, but on the contrary, the intention is to cover all modifications, equivalents, and alternative falling within the spirit and scope of the invention as defined by the appended claims.

What is claimed is:

1. A fault tolerant voltage regulator module circuit for supplying core voltage and cache voltage to a processors upon said processor core voltage and L2 cache voltage being difference, said circuit comprising:

a plurality of main voltage regulator modules for supplying core voltage amd L2 cache voltage to said processor, a stand-by voltage regulator module for use upon a fault occurring in said plurality of main voltage regulator modules;

a plurality of diodes coupled in parallel between each of said plurality of main voltage regulator modules and said stand-by voltage regulator module for automatically supplying power from said stand-by voltage regulator for automatically supplying power from said stand-by voltage regulator module;

a plurality of first power islands for connecting each of said plurality of main voltage regulator modules and said stand-by voltage regulator module for automatically supplying power from said stand-by voltage regulator module;

a plurality of first power islands for connecting each of said plurality of main voltage regulator modules to said processor and each output port of said plurality of diodes;

a control signal set switch for setting output voltage level of said stand-by voltage regulator module; and a second power island for connecting said stand-by voltage regulator module to input ports of said plurality of diodes and said control signal set switch.

2. A fault tolerant voltage regulator module circuit as set forth in claim 1, to allow said stand-by voltage regulator module to support both core voltage and L2 cache voltage, further comprising a power MOSFET coupled in series with a plurality of schottky diodes and said MOSFET, said plurality of schottky diodes being coupled in parallel with one of said plurality of diodes connected to a L2 cache voltage regulator module of said plurality of main voltage regulator modules and a plurality of power MOSFETs by-passing predetermined ones of said plurality of schottky diodes by control of said control signal set switch.

3. A fault tolerant voltage regulator module circuit as set forth in claim 2, further comprised of said processor operating normally with said core voltage being in a range of 1.8 to 2.1 volts.

4. A fault tolerant voltage regulator module circuit as set forth in claim 3, further comprised of a difference between said core voltage and said L2 cache voltage being compensated for by a combination of said plurality of schottky diodes.

5. A fault tolerant voltage regulator module circuit as set forth in claim 2, further comprised of said processor operating normally with said L2 cache voltage being in a range of 1.8 to 2.8 volts.

6. A fault tolerant voltage regulator module circuit as set forth in claim 2, further comprised of a difference between sad core voltage and said L2 cache voltage being compensated for by a combination of said plurality of schottky diodes.

7. A fault tolerant voltage regulator module circuit as set forth in claim 2, further comprised of said control signal set switch being set to connect each of said plurality of schottky diodes so as to generate an output voltage with a combination of three bit control signals, the number of said connected schottky diodes being in a range of from zero through three.

8. A fault tolerant voltage regulator module circuit as set forth in claim 1, further comprised of said stand-by voltage regulator module controlling output voltage level with five bit control signals.

9. A fault tolerant voltage regulator module circuit as set forth in claim 1, further comprised of said stand-by voltage regulator module supplying back-up power when a fault occurs in said plurality of main voltage regulator modules.

10. A fault tolerant voltage regulator module circuit as set forth in clam 1, further comprised of a sudden voltage drop being detected and power of said stand-by voltage regulator module being automatically supplied to said processor, when a fault occurs in any of said plurality of main vrms between each of said plurality of main vrms and said stand-by voltage.

11. A fault tolerant voltage regulator module circuit as set forth in claim 1, further comprised of an output voltage level of said stand-by vrm being set in consideration of a forward voltage drop of said control signal set switch and said plurality of diodes.

12. A fault tolerant voltage regulator module circuit as set forth in claim 11, a voltage of said power supplied by said stand-by voltage regulator module beg as high as said voltage drop of said plurality of diodes compared with voltage supplied by said plurality of main voltage regulator modules.

13. A fault tolerant voltage regulator module circuit as set forth in claim 12, further comprised of said output voltage level provided by stand-by vrm being regulated by a pull-up resistor or a dip switch so as to set said output voltage of said stand-by vrm as high as said voltage drop of said plurality of diodes rather than said voltage supplied by said plurality of main vrms.

14. A fault tolerant voltage regulator module circuit for simultaneously supplying core voltages to a plurality of processors, said circuit comprising:

a plurality of main voltage regulator modules supplying the same output voltage level to said plurality of processors;

a stand-by regulator module for use upon occurrence of a fault in said plurality of main voltage regulator modules;

a plurality of diodes coupled in parallel between each of said plurality of main voltage regulator modules and said stand-by voltage regulator module automatically supplying power from said stand-by voltage regulator module;

a plurality of first power islands connecting each of said plurality of main voltage regulator modes to said processor and each output port of said plurality of diodes;

a control signal set switch setting an output voltage level of said stand-by voltage regulator module; and a second power island connecting said stand-by voltage regulator module to input ports of said plurality of diodes and said control signal set switch.

15. A fault tolerant voltage regulator module circuit as set forth in claim 14, further comprised of said stand-by voltage regulator module controlling output voltage level with five bit control signals.

16. A fault tolerant voltage regulator module circuit as set forth in claim 14, further comprised of said stand-by voltage regulator module supplying back-up power when a fault occurs in said plurality of main voltage regulator modules.

17. A fault tolerant voltage regulator module circuit as set fort in claim 14, further comprised of a sudden voltage drop being detected and power of said stand-by voltage regulator module being automatically supplied to said processor when a fault occurs in any of said plurality of main voltage regulator modules between each of said plurality of main voltage regulator modules and said stand-by voltage regulator module.

18. A fault tolerant voltage regulator module circuit as set forth in claim 14, further comprised of an output voltage level of said stand-by voltage regulator module being set in consideration of forward voltage drop of said control signal set switch and said plurality of diodes.

19. A fault tolerant voltage regulator module circuit as set forth in claim 18, further comprised of output voltage level of said stand-by voltage regulator module being as high as said voltage drop of said plurality of diodes.

20. A fault tolerant voltage regulator module circuit as set forth in claim 19, further comprising output voltage provided by said stand-by voltage regulator module being regulated by a pull-up resistor or a dip switch so as to set said voltage of said stand-by voltage regulator module as high as said voltage drop of said plurality of diodes rather than a voltage of said plurality of main VRMs.

21. A fault tolerant regulator module circuit as set forth in claim 14, further comprised of said processor operating normally at a core voltage in a range of 1.8 to 2.1 volts.

* * * * *